Figure 1:
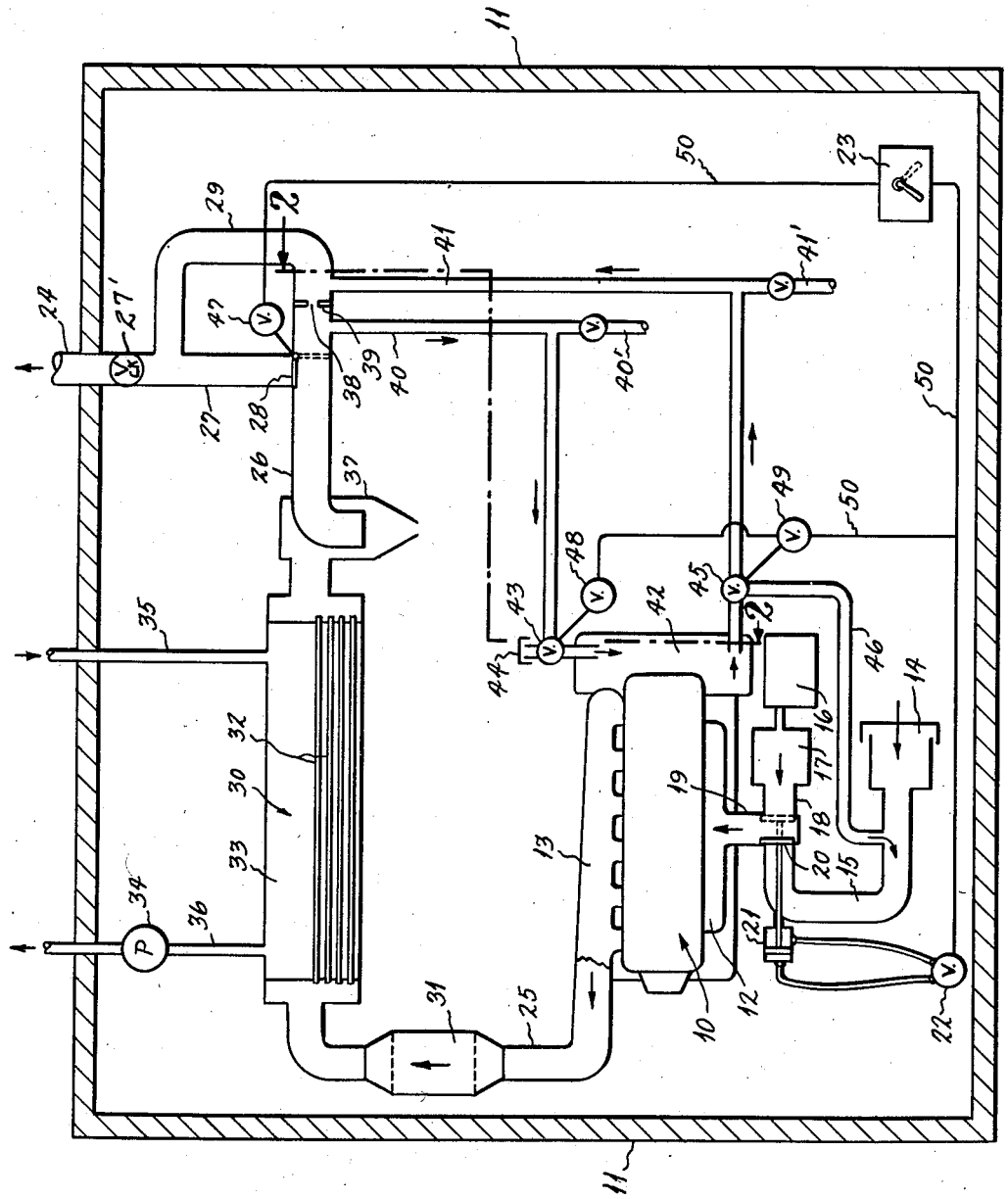

March 26, 1957 — H. S. MICKLEY — 2,786,457
ENGINE EXHAUST DISPOSAL SYSTEM
Filed April 14, 1954 — 2 Sheets-Sheet 1

INVENTOR.
HAROLD S. MICKLEY
BY
ATTORNEY

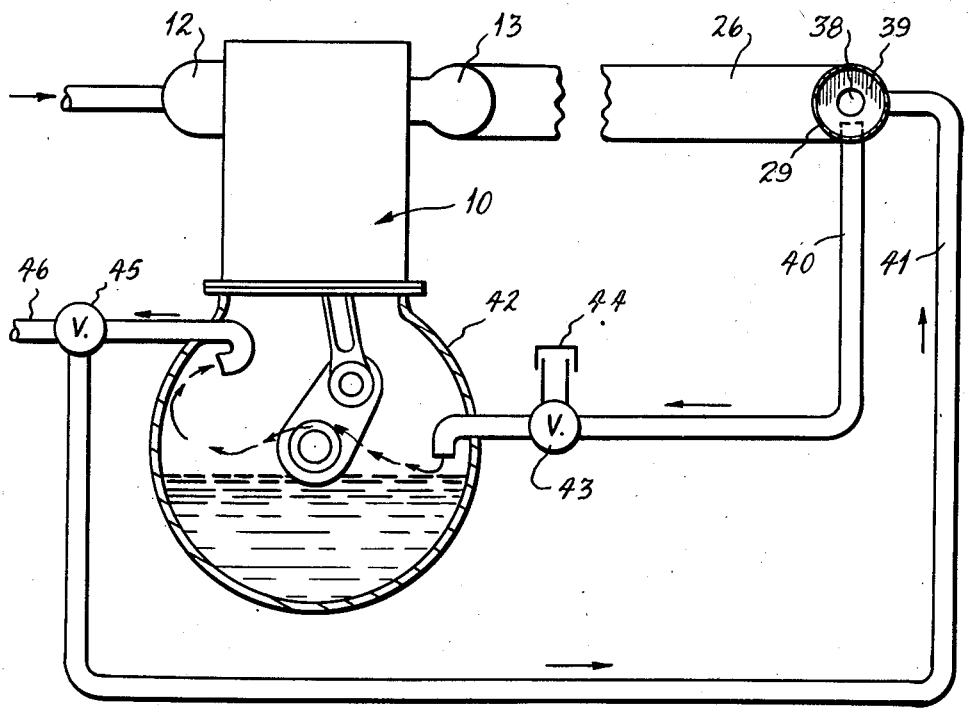

United States Patent Office 2,786,457
Patented Mar. 26, 1957

2,786,457

ENGINE EXHAUST DISPOSAL SYSTEM

Harold S. Mickley, Belmont, Mass., assignor to Fairchild Engine and Airplane Corporation, Farmingdale, N. Y., a corporation of Maryland Application April 14, 1954, Serial No. 423,074

19 Claims. (Cl. 123—41.86)

This invention relates to space ventilating systems, and has particular reference to a system for purging explosive gases from the crankcase of an internal combustion engine.

One of the dangers attending the operation of internal combustion engines is the accumulation of combustible gases in the crankcase which eventually detonate when mixed with oxygen-containing gases in explosive proportions. This condition is aggravated and becomes even more serious during operation of internal combustion engines with hydrogen peroxide or its equivalent as the oxidant, since the usual reason for use of such self-contained oxidants is operation of engines in confined locations remote from available atmosphere oxygen, such as in a submarine boat.

In accordance with the present invention, an automatic engine crankcase breather system is provided whereby the crankcase is continuously cleared of combustible or explosive-forming gases which otherwise tend to accumulate within the confined crankcase space until disastrous detonation occurs.

In a preferred embodiment of the invention, and assuming operation of the engine on hydrogen peroxide, an intake pipe connects the crankcase to the engine exhaust gas duct at a point upstream from a restricted orifice therein with a return pipe connecting the crankcase to the exhaust gas duct at a point downstream from the orifice, whereby a positive circulation of dry exhaust gas is caused through the crankcase.

It will be seen that the pressure differential afforded between opposite sides of the restricted orifice in the exhaust gas stream continuously induces a positive flow of exhaust gases through the engine crankcase, thereby precluding the accumulation in the crankcase of an explosive mixture of fuel gases or lubricating oil and oxygen or other oxidant during operation of the engine.

For a more complete understanding of the invention, reference may be had to the accompanying drawings, in which:

Figure 1 is a semi-schematic diagram of an internal combustion engine having its exhaust gas duct provided with the positive crankcase flushing system of this invention for use during engine operation with self-contained oxidant, such as hydrogen peroxide; and Fig. 2 is a cross-section through the system of this invention, as seen along the line 2—2 of Fig. 1.

Referring to Fig. 1 of thhe drawings, numeral 10 designates an internal combustion engine, preferably of the Diesel type, suitably supported in the engine compartment 11 of a vehicle such as a submarine boat, although the invention is not limited to that use.

The engine 10 is provided with the usual intake manifold 12 and exhaust manifold 13 and is arranged for alternative atmospheric oxygen or self-contained oxidant operation as during surface operation in the former case and submerged operation in the latter case. To that end, either atmospheric air from air intake 14 is supplied by duct 15 to intake manifold for admixture with hydrocarbon fuel injected into the engine cylinders, or decomposed hydrogen peroxide or equivalent oxygen is supplied to the intake manifold from source 16.

Assuming that hydrogen peroxide is the self-contained oxidant, it is supplied from source 16 through the catalytic decomposition chamber 17 through duct 18 to the T-fitting 19 also connecting air duct 15 to the intake manifold 12. The alternative communication of ducts 15 and 18 with the intake manifold 12 is controlled by dual cycle valve 20 mounted in T-fitting 19 and shifted from one to the other extreme position shown in Fig. 1 by hydraulic cylinder 21 operated by valve 22, preferably controlled from a common control 23, to be described. It will be understood that dual cycle valve 20 may be pneumatically, electrically or directly mechanically operated, depending upon requirements.

The exhaust gases discharged to exhaust manifold 13 are led directly to atmospheric exhaust stack 24 by exhaust ducts 25, 26 and 27, the exhaust by-pass valve 28 lying in the dotted line position shown in Fig. 1, so that by-pass 29 is closed with condenser 30 being inoperative, although not necessarily so. A normally closed check valve 27' in duct 27 is opened by engine exhaust pressure.

During submerged operation of engine 10 with hydrogen peroxide as the oxidant, the exhaust gases from manifold 13 are freed of unburned combustible products and mixtures and are cooled to reduce volume and condense entrained water vapor. The removal of combustible materials from the exhaust gases is effected in catalyst chamber 31, interposed in duct 25 and of known construction. In catalyst chamber 31, all unburned combustible materials, such as carbon monoxide, hydrogen, oil vapors, carbon particles and the like, are completely oxidized. In order to insure complete oxidation of such unburned components, an oxygen-rich mixture is supplied to the engine so that sufficient residual oxygen will remain in the exhaust gases to attain that end.

After leaving the catalyst chamber 31, the combustible-free exhaust gases pass through the tubes 32 of condenser 30 which are surrounded by sea water supplied to condenser jacket 33 by a suitable pump 34 connected to either the intake or return pipes 35 and 36. The exhaust gases are cooled in condenser 30 to a temperature of about 100° F., i. e., below the water condensation or dew point, so that the moisture entrained therein is condensed and is removed from the gases by water separator 37, from which it is pumped overboard by suitable means, not shown. The exhaust gases also are materially reduced in volume by the cooling effected in condenser 30, so that the amount to be discharged into the sea from exhaust stack 24 is relatively small.

The crankcase flushing system of this invention utilizes some of the moisture- and combustible-freed exhaust gas flowing from duct 26 into by-pass 29, by-pass valve 28 being in the solid line position shown in Fig. 1 during peroxide operation. Division of the required amount of combustion gases is effected by the differential pressure created in by-pass 29 by the restricted orifice afforded by the opening 38 formed in the diaphragm-like plate 39 extending across the by-pass 29, as shown especially in Fig. 2.

Connected to by-pass 29 at opposite sides of the orifice plate 39 are pipes 40 and 41. Due to the resistance to flow afforded by the orifice plate 39, pressure increases on the upstream side thereof, whereas the resulting increased velocity of flow through the orifice 38 causes a pressure decrease on the downstream side of plate 39, so that flow is induced into pipe 40 and out of pipe 41. Pipe 40 leads to the interior of the crankcase 42 through open two-way valve 43 which closes pipe 41 from atmospheric breather 44 when the engine 10 is operating on peroxide. Similarly, upstream pipe 41 leads from the interior of crankcase 42 through normally open two-way valve 45, which closes the connection of auxiliary vent pipe 46 to air intake duct 15 when the engine is operating on peroxide.

As is indicated in Fig. 1, valves 28, 43 and 45, are actuated by respective mechanisms 47, 48 and 49, similar to 22 for valve 20 and may be hydraulically, pneumatically, electrically or directly mechanically operated and preferably simultaneously from a common control 23 by suitable connecting means 50.

Operation of the ventilating system will be readily understood from the foregoing description of the component parts thereof. However, a typical cycle shift from atmospheric oxygen operation to peroxide operation will be described to illustrate the sequence of operations. Assuming that the system is in use on a propulsion engine of a submarine boat operating on the surface, central control 23 will have been actuated to place dual-cycle valve 20 in the dotted line position shown in Fig. 1 as opening atmospheric air intake duct 15 and closing peroxide supply duct 18; exhaust by-pass valve 28 will have been placed in the dotted line position shown in Fig. 1 to close by-pass 29 and open exhaust duct 27 to exhaust stack 24, and valves 43 and 45 will have closed the communication of respective pipes 40 and 41 with the crankcase 42 and opened the communication of breather 44 and vent pipe 46 with the crankcase.

The operating engine 10 draws air from the engine compartment 11 through intake 14, duct 15, open valve 20, duct 19 and intake manifold 12, and the intake air stream flowing over the outlet of vent pipe 46 induces outward flow therethrough from crankcase 42 through open valve 45 and inward flow of atmospheric air through breather 44 and open valve 43. Accordingly, accumulated combustible material is drawn from the crankcase into the engine 10 to be consumed therein.

The combustion gases flow from exhaust manifold through duct 25, catalyst chamber 31 where unburned gases and carbon are burned in an excess of oxygen from the engine 10 to preclude emission of sparks and flame from the exhaust stack 24 to which the gases are led from catalyst chamber 31 by ducts 26, open by-pass valve 28 and duct 27, the condenser 30 normally not being in use during surface operation.

For shifting to submerged operation on hydrogen peroxide, the common control 23 is actuated to cause dual-cycle valve 20 to move to the solid line position shown in Fig. 1, thereby closing atmospheric air intake duct and opening peroxide supply duct 18; exhaust by-pass valve 28 is moved to the solid line position shown in Fig. 1 to open by-pass 29 and close duct 27 to stack 24; valve 43 is moved to close breather 44 and place pipe 40 in communication with crankcase 42, and valve 45 is moved to close vent pipe 46 and place pipe 41 in communication with crankcase 42.

The shift to peroxide operation is instantaneous and the engine continues to operate without interruption as the hydrogen peroxide decomposition products are supplied from catalyst chamber 17 through duct 18, open valve 20, duct 19 and intake manifold 12 to the engine for supporting the combustion of the hydrocarbon fuel continuously supplied thereto. As previously stated, an excess of oxygen is fed to the engine so that the exhaust gases contain sufficient oxygen to oxidize the contained or entrained combustibles in the catalyst chamber, so that the gases entering the condenser 30 are free of carbon monoxide, hydrogen, oil vapors, carbon particles, and the like.

In passing through the tubes 32 of the condenser 30 the exhaust gases are cooled down to about 100° F. by the sea water continuously circulated through the condenser jacket 33 by the pump 34. The considerable amount of water vapor contained in the exhaust gases as the result of the oxidation of the hydrogen component of the hydrogen peroxide and from other sources is accordingly condensed in condenser 30. The condensate is collected in water separator or trap 37 and pumped overboard. The exhaust gases are now moisture free, and have been materially reduced in volume, due to the cooling in condenser 30, so that the volume of gas necessary to be dispersed into the sea is relatively small.

With the by-pass valve lying in the position shown in solid lines in Fig. 1, the moisture- and combustible-freed exhaust gases are diverted to the by-pass 38, wherein, by reason of the pressure drop between the upstream and downstream sides of the orifice plate 39, a portion of the exhaust gases flow into pipe 40, past open valve 43 into and through crankcase 42, out past open valve 45, through pipe 41, and back into by-pass 29 at the low pressure or downstream side of orifice plate 39. The dry and clean exhaust gases thus flowing into the crankcase 42 circulate around therein and flush it out, thereby preventing the accumulation of the explosive gas mixtures resulting from leakage past the piston rings and otherwise during operation of the engine. It will be understood that the use of hydrogen peroxide with its desirably highly combustible decomposition components in admixture with hydrocarbon fuel, also is accompanied by the danger of explosion if these mixtures accumulate in a confined space such as the crankcase.

The alleviation of this dangerous condition is the important attribute of the system of this invention, not only for crankcase purging, but also other confined spaces which are not customarily used by personnel and in which combustible toxic gases or vapors may collect, such as battery compartments, bilges, fuel tank head spaces, and the like, through which the pipes 40 and 41, or branches 40', 41' thereof may circulate the dry and combustible-free exhaust for maintaining them clear of combustible vapors or gases in the manner described. However the system is employed, the flushing exhaust gases are returned with the flushed gases or vapors by pipe 41 to the by-pass 29 for ejection through exhaust stack 24.

For shallow submerged operation on atmospheric oxygen drawn from a surface breather, such as the floating or "snorkel" type, it may be desirable to flush the crankcase clear of accumulating combustible gases leaking thereto, and in that case, the valves 28, 43 and 45 are shifted, but the dual cycle valve 20 remains in the dotted line position shown in Fig. 1 with air intake 14 connected to the surface breather. Thus, by-pass 29 is open and duct 27 is closed by valve 28, and valves 43 and 45 connect respective pipes 40 and 41 to the crankcase 42 with breather 44 and vent pipe 46 disconnected therefrom.

As the engine operates on atmospheric oxygen, the orific plate 39 creates a differential pressure on the gases at opposite sides thereof, thereby inducing flow of a portion of the dry and combustible-free exhaust gases from by-pass 29 into pipe 40, through crankcase 42, out through pipe 41 and back to by-pass 29 to join the exhaust gases ejected into the sea through exhaust stack 24, as has been described. In this way the crankcase 42 or other confined space in which combustible or toxic gases or vapors are likely to accumulate to a dangerous extent may be continuously freed thereof, even during special operating conditions such as the shallow submerge operation just described. Also in certain instances, whether during surface or shallow submersion low power operation on atmospheric air, it may be desirable to circulate exhaust gases through the crankcase at a low rate, utilizing principally the engine intake suction to induce the exhaust gas circulation. In that case, the valves are selectively positioned so that dual cycle valve lies in the dotted line atmospheric supply position shown in Fig. 1, by-pass valve 28 lies in the open or solid line position shown in Fig. 1, valve 43 lies in position to close breather 44 and open pipe 40, but valve 45 is moved to close pipe 41 and connect the vent pipe 46 to the air intake duct 15. Thus, some pressure on the exhaust gases is built up at the upstream side of orifice plate 39 at the entrance to inlet pipe 40 and suction is created in vent pipe 46 by reason of the intake suction of the engine in intake duct 15, so that flow of exhaust gases is induced from by-pass 29, through inlet pipe 40, crankcase 42 and vent pipe 46 to air intake duct 15, thereby flushing the crankcase free of combustible gases and vapors.

Although a preferred embodiment of the invention has been illustrated and described herein, it is to be understood that the invention is not limited thereby, but is susceptible to changes, such as the use of a venturi instead of the orifice plate 39 and the like, all within the scope of the appended claims.

I claim:

1. In a system for purging a compartment of undesired combustible gases from an internal combustion engine having an exhaust gas duct, the combination of an intake connection between said duct and said compartment, a discharge connection between said compartment and said duct, and means forming a constriction in said duct at a point between said connections thereto for inducing the flow of a portion of the exhaust gases from said duct into said intake connection, through said compartment, out of said discharge connection and back to said duct.

2. In a system for purging a compartment of undesired combustible gases from an internal combustion engine having an exhaust gas duct, the combination of means projecting into said duct forming a constriction therein, a connection between said duct at one side of said means and said compartment, and a connection between said duct at the other side of said means and said compartment, whereby the differential pressure created on the gases by said means induces the flow of a portion of the exhaust gases through said connections and compartment.

3. In a system for purging a compartment of undesired combustible gases from an internal combustion engine having an exhaust gas duct, the combination of an intake connection between said duct and said compartment, a discharge connection between said compartment and said duct, and an apertured member interposed in said duct at a point between said connections thereto for creating a differential pressure at opposite sides of said member and thereby inducing the flow of a portion of the exhaust gases from said duct into said intake connection, through said compartment, out of said discharge connection and back to said duct.

4. In a system for purging a compartment of undesired combustible gases from an internal combustion engine having an exhaust gas duct, the combination of an intake connection between said duct and said compartment, a discharge connection between said compartment and said duct, and a member extending across said duct at a point between said connections thereto and having a passage therein of smaller cross-sectional area than that of the duct at that point for creating a differential pressure at opposite sides of said member and thereby inducing the flow of a portion of the exhaust gases from said duct into said intake connection, through said compartment, out of said discharge connection and back to said duct.

5. In a system for purging a compartment of undesired combustible gases from an internal combustion engine having an exhaust gas duct, the combination of means extending across said duct and having a passage therein of smaller cross-sectional area than that of the duct and thereby forming a constriction therein, a connection between said duct at one side of said means and said compartment, and a connection between said duct at the other side of said means and said compartment space, whereby the differential pressure created on the gases by said means induces the flow of a portion of the exhaust gases through said connections and compartment.

6. In a system for purging a compartment of undesired combustible gases from an internal combustion engine having an exhaust gas duct, the combination of a by-pass around a portion of said duct, means projecting into said by-pass forming a constriction therein, a connection between said by-pass at one side of said means and said compartment, and a connection between said by-pass at the other side of said means and said compartment, whereby the differential pressure created on the gases by said means induces the flow of a portion of the exhaust gases through said connections and compartment.

7. In a system for purging a compartment of undesired combustible gases from an internal combustion engine having an exhaust gas duct, the combination of a by-pass around a portion of said duct, a valve interposed between said duct and said by-pass for connecting said by-pass to said duct, means projecting into said by-pass forming a constriction therein, a connection between said by-pass at one side of said means and said compartment, and a connection between said by-pass at the other side of said means and said compartment, whereby the differential pressure created on the gases by said means induces the flow of a portion of the exhaust gases through said connections and compartment.

8. In a system for purging a compartment of undesired combustible gases from an internal combustion engine having an exhaust gas duct, the combination of means projecting into said duct forming a constriction therein, a connection between said duct at one side of said means and said compartment, a connection between said duct at the other side of said means and said compartment, whereby the differential pressure created on the gases by said means induces the flow of a portion of the exhaust gases through said connections and compartment, and catalytic means in said duct between the engine and said constriction-forming means for removing the combustible components remaining in the exhaust gases.

9. In a system for purging a compartment of undesired combustible gases from an internal combustion engine having an exhaust gas duct, the combination of means projecting into said duct forming a constriction therein, a connection between said duct at one side of said means and said compartment, a connection between said duct at the other side of said means and said comparment, whereby the differential pressure created on the gases by said means induces the flow of a portion of the exhaust gases through said connections and compartment, and cooling means in said duct between the engine and said constriction-forming means for condensing water vapor from the exhaust gases.

10. In a system for purging a compartment of undesired combustible gases from an internal combustion engine having an exhaust gas duct, the combination of means projecting into said duct forming a constriction therein, a connection between said duct at one side of said means and said compartment, a connection between said duct at the other side of said means and said compartment, whereby the differential pressure created on the gases by said means induces the flow of a portion of the exhaust gases through said connections and compartment, and means interposed between the engine and said constriction-forming means for removing the combustible materials and water from the exhaust gases in said duct.

11. In a system for purging a compartment of undesired combustible gases from an internal combustion engine having an exhaust gas duct, the combination of a by-pass around a portion of said duct, catalytic means in said duct between the engine and said by-pass for removing the combustible components in the exhaust gases, an intake connection between said by-pass and said compartment, a discharge connection between said compartment and said by-pass, and means for inducing the flow of the gases from said by-pass through said intake connection, said compartment and said discharge connection back to said by-pass.

12. In a system for purging a compartment of undesired combustible gases from an internal combustion engine having an exhaust gas duct, the combination of a by-pass around a portion of said duct, cooling means in said duct between the engine and said by-pass for removing the condensible components in the exhaust gases, an intake connection between said by-pass and said compartment, a discharge connection between said compartment and said by-pass, and means for inducing the flow of the gases from said by-pass through said intake connection, said compartment and said discharge connection back to said by-pass.

13. In a system for purging a compartment of undesired combustible gases from an internal combustion engine having an exhaust gas duct, the combination of an intake connection between said duct and said compartment, a discharge connection between said compartment and said duct, constriction-forming means for inducing the flow of a portion of the exhaust gases from said duct into said intake connection, through said compartment, out of said discharge connection and back to said duct, and means interposed between the engine and said constriction-forming means for removing the combustible materials and water from the exhaust gases in said duct.

14. In a crankcase ventilating system for an internal combustion engine adapted to operate alternatively on atmospheric oxygen and decomposed hydrogen peroxide as the fuel combustion oxidant, and having intake and exhaust ducts, the combination of a source of atmosphere connected to said inlet duct, a source of hydrogen peroxide decomposition product connected to said inlet duct, a normally closed valve interposed in one of said connections, means for moving said valve to close the other connection and open said one connection, an inlet pipe connecting said exhaust duct to the crankcase, a discharge pipe spaced from said inlet pipe connection to said exhaust duct and connecting the latter to said crankcase, and means in said exhaust duct between said pipe connections therewith and forming a constriction therein, whereby the differential pressure created on the exhaust gases on opposite sides of said constriction-forming means induces the flow of exhaust gases into said inlet pipe, through said crankcase and discharge pipe to ventilate the same during either alternative atmospheric or peroxide operation of the engine.

15. In a crankcase ventilating system for an internal combustion engine adapted to operate alternatively on atmospheric oxygen and decomposed hydrogen peroxide as the fuel combustion oxidant, and having intake and exhaust ducts, the combination of a source of atmosphere connected to said inlet duct, a source of hydrogen peroxide decomposition product connected to said inlet duct, a normally closed valve interposed in one of said connections, means for moving said valve to close the other connection and open said one connection, a by-pass connected to said exhaust duct, a normally closed valve in the connection between the by-pass and said exhaust duct, means for moving said by-pass valve to open said by-pass and close said exhaust duct, an inlet pipe connecting said by-pass to the crankcase, a discharge pipe spaced from said inlet pipe connection to said by-pass and connecting the latter to said crankcase, and means in said by-pass between said pipe connections therewith and forming a constriction therein, whereby the differential pressure created on the exhaust gases on opposite sides of said constriction-forming means induces the flow of exhaust gases into said inlet pipe, through said crankcase and discharge pipe to ventilate the same during either alternative atmospheric or peroxide operation of the engine.

16. In a crankcase ventilating system for an internal combustion engine adapted to operate alternatively on atmospheric oxygen and decomposed hydrogen peroxide as the fuel combustion oxidant, and having intake and exhaust ducts, the combination of a source of atmosphere connected to said inlet duct, a source of hydrogen peroxide decomposition product connected to said inlet duct, a normally closed valve interposed in one of said connections, means for moving said valve to close the other connection and open said one connection, a by-pass connected to said exhaust duct, a normally closed valve in the connection between the by-pass and said exhaust duct, means for moving said by-pass valve to open said by-pass and close said exhaust duct, an inlet pipe connecting said by-pass to the crankcase, a discharge pipe spaced from said inlet pipe connection to said by-pass and connecting the latter to said crankcase, common control means for both of said valve moving means for opening said by-pass upon opening of said peroxide connection to said inlet duct, and means in said by-pass between said pipe connections therewith and forming a constriction therein, whereby the differential pressure created on the exhaust gases on opposite sides of said constriction-forming means induces the flow of exhaust gases into said inlet pipe, through said crankcase and discharge pipe to ventilate the same.

17. In a crankcase ventilating system for an internal combustion engine adapted to operate alternatively on atmospheric oxygen and decomposed hydrogen peroxide as the fuel combustion oxidant, and having intake and exhaust ducts, the combination of a source of atmosphere connected to said inlet duct, a source of hydrogen peroxide decomposition product connected to said inlet duct, a normally closed valve interposed in said first-named connection, means for moving said valve to close the other connection and open said first-named connection, an inlet pipe connecting said exhaust duct to the crankcase, a discharge pipe spaced from said inlet pipe connection to said exhaust duct and connecting the latter to said crankcase, a normally open valve in said inlet pipe, a vent pipe connecting said crankcase to said atmospheric connection, means for moving said last-named valve, means in said exhaust duct between said pipe connections therewith and forming a constriction therein, whereby the differential pressure created on the exhaust gases on opposite sides of said constriction-forming means induces the flow of exhaust gases into said inlet pipe, through said crankcase and discharge pipe to ventilate the same during peroxide operation of the engine, and means for actuating said valve moving means to close said peroxide connection and open said atmospheric connection to the engine intake duct and close said inlet pipe valve and open said vent pipe, whereby the suction created by the engine in the atmospheric connection induces flow from said crankcase and through said vent pipe to thereby ventilate the crankcase during atmospheric operation of the engine.

18. In a crankcase ventilating system for an internal combustion engine adapted to operate alternatively on atmospheric oxygen and decomposed hydrogen peroxide as the fuel combustion oxidant, and having intake and exhaust ducts, the combination of a source of atmosphere connected to said inlet duct, a source of hydrogen peroxide decomposition product connected to said inlet duct, a normally closed valve interposed in said first-named connection, means for moving said valve to close the other connection and open said first-named connection, an inlet pipe connecting said exhaust duct to the crankcase, a discharge pipe spaced from said inlet pipe connection to said exhaust duct and connecting the latter to said crankcase, a normally open valve in said inlet pipe, a breather for said crankcase and normally closed by said last-named valve, means for moving said last-named valve to open said breather and close said inlet pipe, a normally open valve in said discharge pipe, a vent pipe connecting said crankcase to said atmospheric connection and normally closed by said last-named valve, means for moving said last-named valve to close said discharge pipe and open said vent pipe, means in said exhaust duct between said pipe connections therewith and forming a constriction therein, whereby the differential pressure created on the exhaust gases on opposite sides of said constriction-forming means induces the flow of exhaust gases into said inlet pipe, through said crankcase and discharge pipe to ventilate the same during peroxide operation of the engine, and means for actuating said valve moving means to close said peroxide connection and open said atmospheric connection to the engine intake duct and close said inlet and discharge pipe valve and open said breather and vent pipe, whereby the suction created by the engine in the atmospheric connection induces flow from said breather and through said crankcase and through said vent pipe to thereby ventilate the crangcase during atmospheric operation of the engine.

19. In a crankcase ventilating system for an internal combustion engine having a crankcase and a combustion chamber, the combination of an air intake duct leading to said combustion chamber, an exhaust gas duct leading from said combustion chamber, an inlet pipe connecting the crankcase to said exhaust gas duct, and a vent pipe connecting said crankcase to said air intake duct, whereby the suction created by the engine in the air intake duct thereof draws exhaust gases from said exhaust gas duct through said inlet pipe, said crankcase and said vent pipe to thereby continuously flush combustible gases and vapors from the crankcase.

References Cited in the file of this patent

UNITED STATES PATENTS

| 1,323,006 | Branen | Nov. 25, 1919 |
| 1,766,900 | Griswold | June 24, 1930 |
| 1,973,384 | Minter | Sept. 11, 1934 |
| 2,429,732 | Roos | Oct. 28, 1947 |